(12) United States Patent
Blanz et al.

(10) Patent No.: US 6,847,630 B2
(45) Date of Patent: Jan. 25, 2005

(54) COMMUNICATIONS IN AN ASYNCHRONOUS CELLULAR WIRELESS NETWORK

(75) Inventors: Josef Blanz, Munich (DE); Serge Willenegger, Onnens (CH)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 10/177,270

(22) Filed: Jun. 21, 2002

(65) Prior Publication Data

US 2003/0091022 A1 May 15, 2003

Related U.S. Application Data

(60) Provisional application No. 60/337,472, filed on Nov. 9, 2001.

(51) Int. Cl.[7] .................................................. H04J 3/06
(52) U.S. Cl. ...................... 370/350; 370/516; 370/518; 375/371; 375/356
(58) Field of Search ................................. 370/350, 310, 370/328, 324, 503, 516, 518, 519; 375/371, 356

(56) References Cited

U.S. PATENT DOCUMENTS

| | | | | |
|---|---|---|---|---|
| 6,246,673 | B1 * | 6/2001 | Tiedemann et al. | 370/333 |
| 6,266,529 | B1 * | 7/2001 | Chheda | 455/436 |
| 6,289,007 | B1 * | 9/2001 | Kim et al. | 370/331 |
| 6,298,073 | B1 * | 10/2001 | LeFever | 370/503 |
| 6,430,216 | B1 * | 8/2002 | Kober et al. | 375/148 |
| 6,504,830 | B1 * | 1/2003 | Ostberg et al. | 370/342 |
| 6,526,039 | B1 * | 2/2003 | Dahlman et al. | 370/350 |
| 2002/0075837 | A1 * | 6/2002 | Kim et al. | 370/342 |

FOREIGN PATENT DOCUMENTS

| | | |
|---|---|---|
| EP | 0286614 A1 | 10/1988 |
| WO | 9941854 | 8/1999 |
| WO | 0014907 | 3/2000 |

OTHER PUBLICATIONS

Baier, Alfred et al., "Design Study for A CDMA–Based Third–Generation Mobile Radio System", May 1994, IEEE Journal on Selected Areas in Communications, vol. 12, No. 4, pp. 733–743.*

Yahata, "Autonomous Master–Slave Frame Synchronization among Microcellular Base Stations" Electronics and Communications in Japan, Scripta Technica, Part 1, New York, vol. 82, No. 4, 1999, pp. 1–13.

* cited by examiner

*Primary Examiner*—Duc Ho
*Assistant Examiner*—Michael Joseph Molinari
(74) *Attorney, Agent, or Firm*—Philip R. Wadsworth; Thien T. Nguyen; Erin P. Madill

(57) ABSTRACT

Systems and techniques are disclosed for establishing a reference corresponding to the timing of a received signal from the first source, determining the timing for each received signal from a plurality of second sources, adjusting the reference to the timing of the received signal from one of the second sources, the timing of the received signal used to adjust the reference being closest in time to the unadjusted reference, and synchronizing a signal to the reference for transmission. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

53 Claims, 6 Drawing Sheets

COMMUNICATIONS IN AN ASYNCHRONOUS CELLULAR WIRELESS NETWORK

CROSS-REFERENCE TO RELATED APPLICATIONS

The present application claims priority under 35 U.S.C. § 119(e) to provisional Application Ser. No. 60/337,472, filed Nov. 9, 2001, the contents of which are incorporated herein by reference.

BACKGROUND

1. Field

The present invention relates to communications systems, and more specifically, to systems and techniques for synchronizing a communications device to an asynchronous network access point.

2. Background

Modern communications systems are designed to allow multiple users to share a common communications medium. One such communications system is a code division multiple access (CDMA) system. A CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, and thereby, spreads the spectrum of the signal waveform. The transmitted signals are separated in the receiver by a correlator that uses a corresponding code to despread the signal's spectrum. The undesired signals, whose codes do not match, are not despread in bandwidth and contribute only to noise.

In a CDMA communications system, a user may access a network, or communicate with other users, through a network access point. A network access point generally includes a radio network controller supporting multiple nodes. For the purpose of this disclosure, the term "node" will be used to refer to a node B, a base station, or any other similar communications station. Each node is assigned to serve all users within a region generally referred to as a cell or sector. Within any given region, a user may be in communication with any number of neighboring nodes as well as the node serving the region.

In some CDMA communications systems, the nodes are synchronized to one another. By way of example, the Navstar Global Positioning satellite navigation system is often used to synchronize the nodes to a common time reference. As a result, once a user acquires and synchronizes to a node, it can synchronously communicate with other nodes as it travels from region to region. This is to be contrasted to an asynchronous CDMA communications system which may require the user to resynchronize to different nodes as it travels through various regions of coverage. The resynchronization process should be performed quickly to minimize potential interruptions in communications that may be perceived by the user. Furthermore, it would be advantageous to minimize the time during which a user is performing the resynchronization process because this reduces the risk of dropped radio communication links to nodes other than the reference node, and it makes position estimates that are based on propagation delay measurements more accurate.

SUMMARY

In one aspect of the present invention, a method of communications includes establishing a reference corresponding to the timing of a received signal from a first source, determining the timing for each received signal from a plurality of second sources, adjusting the reference to the timing of the received signal from one of the second sources, the timing of the received signal used to adjust the reference being closest in time to the unadjusted reference, and synchronizing a signal to the reference for transmission.

In another aspect of the present invention, an apparatus includes a searcher configured to establish a reference corresponding to the timing of a received signal from a first source, determine the timing for each received signal from a plurality of second sources, adjust the reference to the timing of the received signal from one of the second sources, the timing of the received signal used to adjust the reference being closest in time to the unadjusted reference, and synchronize a signal to the reference for transmission.

In yet another aspect of the present invention, computer-readable media embodying a program of instructions executable by a computer performs a method of communications, the method includes establishing a reference corresponding to the timing of a received signal from a first source, determining the timing for each received signal from a plurality of second sources, adjusting the reference to the timing of the received signal from one of the second sources, the timing of the received signal used to adjust the reference being closest in time to the unadjusted reference, and synchronizing a signal to the reference for transmission.

In a further aspect of the present invention, an apparatus includes reference means for establishing a reference corresponding to the timing of a received signal from a first source, means for determining the timing for each received signal from a plurality of second sources, adjustment means for adjusting the reference to the timing of the received signal from one of the second sources, the timing of the received signal used to adjust the reference being closest in time to the unadjusted reference, and means for synchronizing a signal to the reference for transmission.

It is understood that other embodiments of the present invention will become readily apparent to those skilled in the art from the following detailed description, wherein it is shown and described only in exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of exemplary embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Although various aspects of the present invention will be described in the context of a CDMA communications system, those skilled in the art will appreciate that these aspects are likewise suitable for use in various other communications environments. Accordingly, any reference to a CDMA communications system is intended only to illustrate the inventive aspects of the present invention, with the understanding that such inventive aspects have a wide range of applications.

Figure 1:
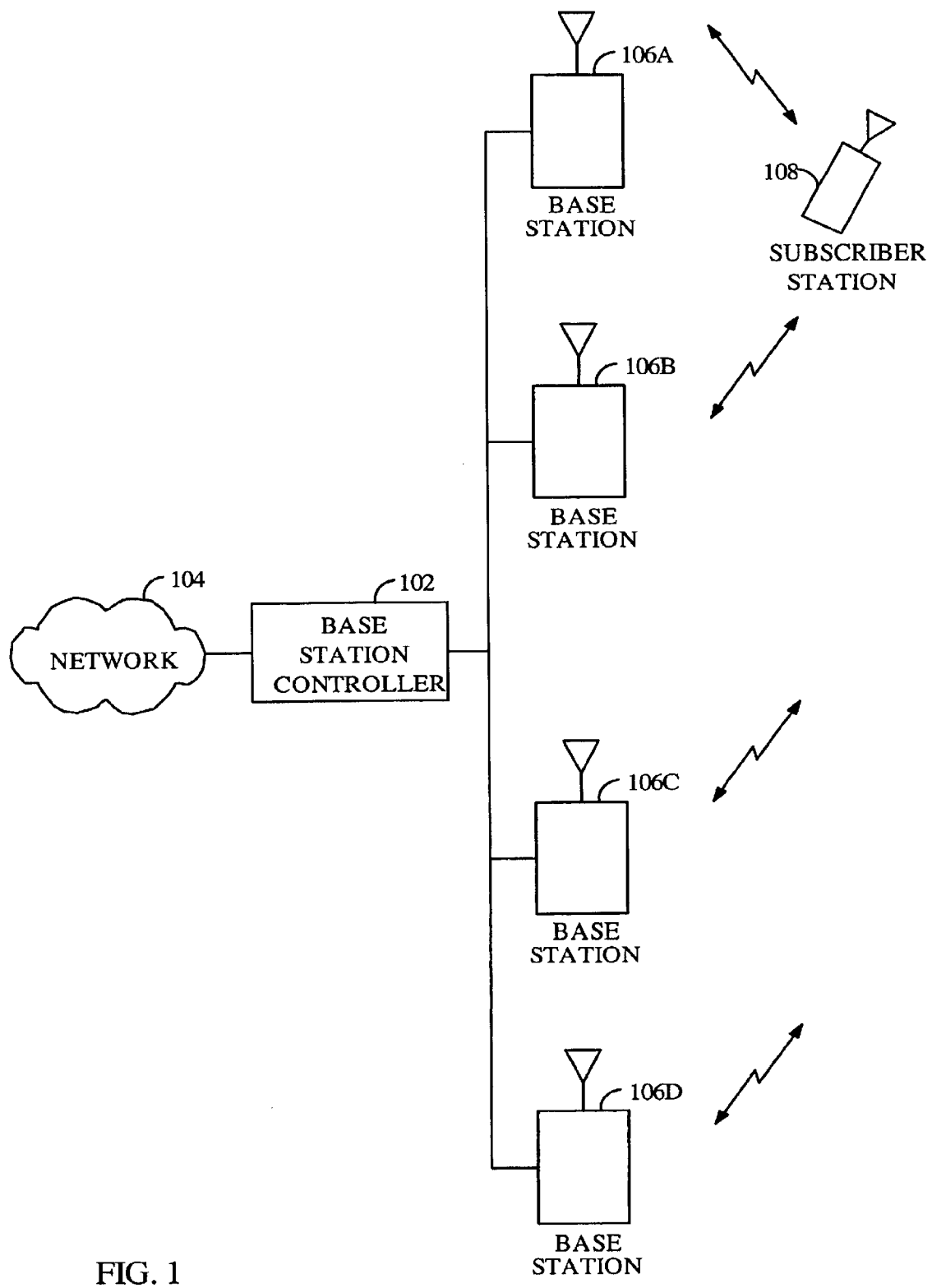
FIG. 1 is a conceptual overview of an exemplary asynchronous CDMA communications system.

FIG. 1 is a functional block diagram of an asynchronous CDMA communications system. A radio network controller 102 can be used to provide an interface between a network 104 and all nodes 106a–d dispersed throughout a geographic area. The geographic area is generally divided into regions known as cells or sectors. A node is generally assigned to serve all users in a region. User equipment 108 may access the network 104, or communicate with other user equipment, through one or more nodes under control of the radio network controller 102. In the case where the user equipment 108 is in communication with more than one node, the user equipment 108 selects a reference node as a synchronization source for its transmissions to all nodes. As the user equipment 108 moves away from the reference node, the user equipment may ultimately need to select a new node as a synchronization source. The user equipment can select the node that requires the least amount of stewing to resynchronize its transmissions. Slewing refers to the process of adjusting the transmit signal timing of the user equipment in order to synchronize it with a new synchronization source. To minimize stewing, the user equipment can select the node whose signals are received closest in time to the previous received signals from the reference node.

An exemplary asynchronous CDMA communications system may be designed to support the FDD mode of operation of the standard offered by a consortium named "3rd Generation Partnership Project" referred to herein as 3GPP, and embodied in a set of documents including Document Nos. 3GPP TS21.101 3GPP TS 25.211, 3GPP TS 25.212, 3GPP TS 25.213, 3GPP TS 25.214, and 3G TS 25.133, referred to herein as the W-CDMA standard. The W-CDMA standard is expressly incorporated herein by reference. W-CDMA specifications issued by 3GPP are public record and are well known in the art. W-CDMA (also known as UTRA-FDD) is adopted and issues as a regional standard by various standardization bodies as for instance by the European Telecommunications Standard Institute (ETSI). The 3GPP specifications describe the use of a combination of the physical channels SCH and CPICH transmitted by each node in a W-CDMA communications system. SCH and CPICH can be used by the user equipment to synchronize to different nodes as the user equipment moves throughout the coverage area.

Figure 2:
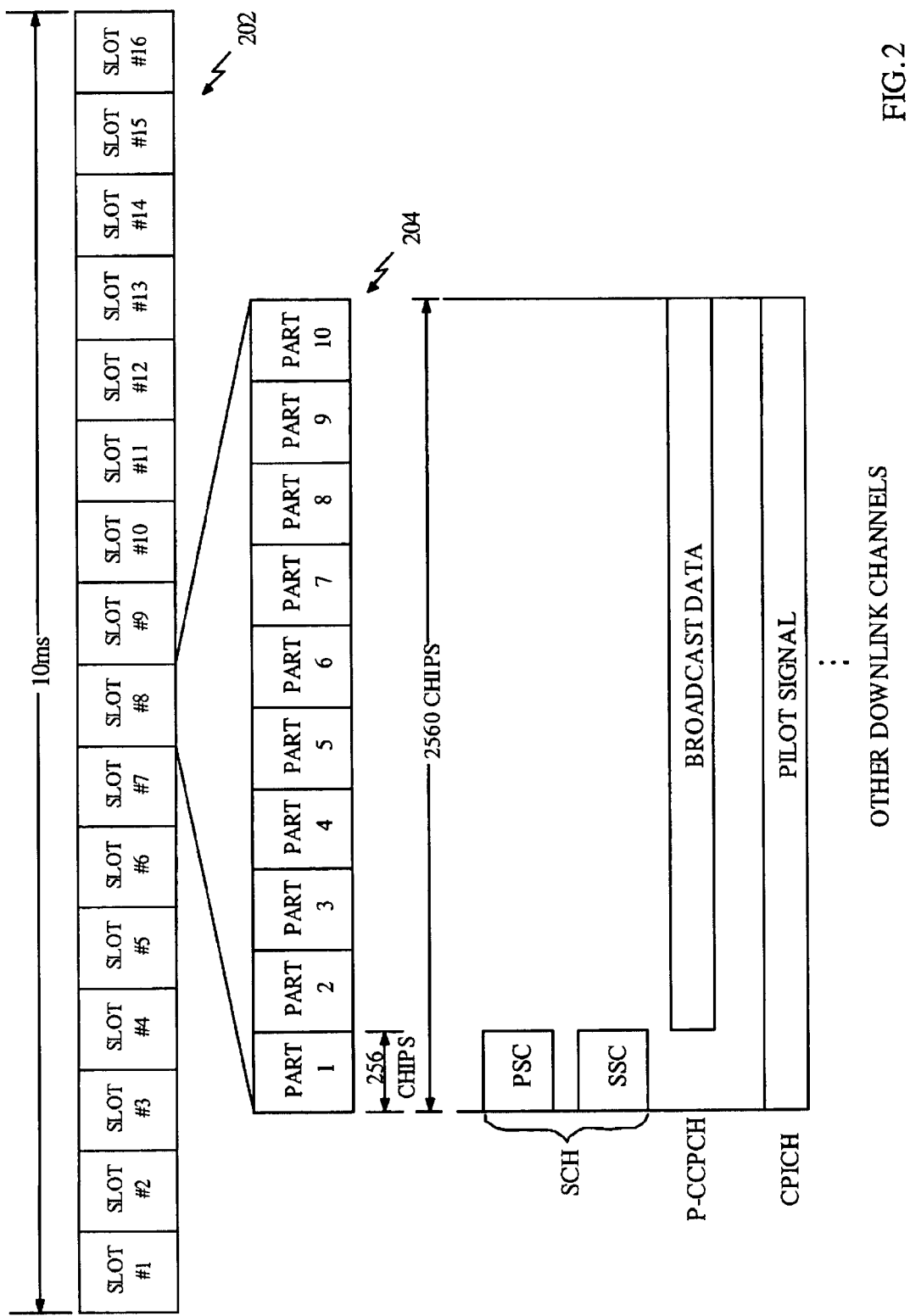
FIG. 2 is a diagram illustrating an exemplary downlink frame structure for the a synchronization channel (SCH), a primary common control physical channel (P-CCPCH), and a common pilot channel (CPICH) transmitted by a node in an asynchronous CDMA communications system.

FIG. 2 is a diagram illustrating a downlink frame structure for the physical channels SCH, CPICH, and P-CCPCH transmitted by a node in a W-CDMA communications system. A frame 202 can be any duration depending on the particular application and overall design constraints. In the described exemplary W-CDMA communications system, the frame duration is ten milliseconds and includes 38,400 chips. The frame can be divided into fifteen slots 204 with each slot having 2560 chips. Each slot 204 can be further partitioned into ten parts 206 with each part having 256 chips.

The SCH and P-CCPCH are time-multiplexed. The SCH is only transmitted during the first part of each slot 204 and the P-CCPCH is transmitted only during parts 2 through 10 of each slot. The CPICH is transmitted in parallel to the SCH and the P-CCPCH. The frame timing for the SCH, P-CCPCH and CPICH is identical. The SCH is sub-divided into a primary SCH carrying a primary synchronization code (PSC) sequence, and a secondary SCH carrying a secondary synchronization code (SSC) sequence. The PSC and the SSC sequences are orthogonal to each other. They are generated using generalized hierarchical Golay sequences and Hadarmard sequences and are transmitted on top of one another. The PSC sequence is the same sequence for every slot and for every node in the coverage area. The SSC sequence can be one of sixteen possible sequences in each slot. The P-CCPCH carries broadcast data such as the identity of the transmitting node and other information that may be of general use to all user equipment in communication with that node. In parallel to the SCH and P-CCPCH, the CPICH is continuously transmitted. The CPICH carries an a priori known pilot signal. The pilot signal can be used by the user equipment to synchronize to the node and serves as a phase reference in order to coherently demodulate data transmitted to the user equipment once the user equipment is synchronized to the node and has successfully completed an access attempt to the system.

The pilot signal contains no data and is often characterized as an unmodulated spread spectrum signal. The pilot signal from each node is generally spread with the same orthogonal code but scrambled with a different node-specific primary scrambling code. The primary scrambling code is truncated at the end of each CPICH frame, and then repeats from the beginning at the start of each frame. In the exemplary W-CDMA communications system there are 512 possible primary scrambling codes for a given node. Also the P-CCPCH is scrambled with the primary scrambling code. The primary scrambling code used by a node is not a priori known by the user equipment.

Figure 3:
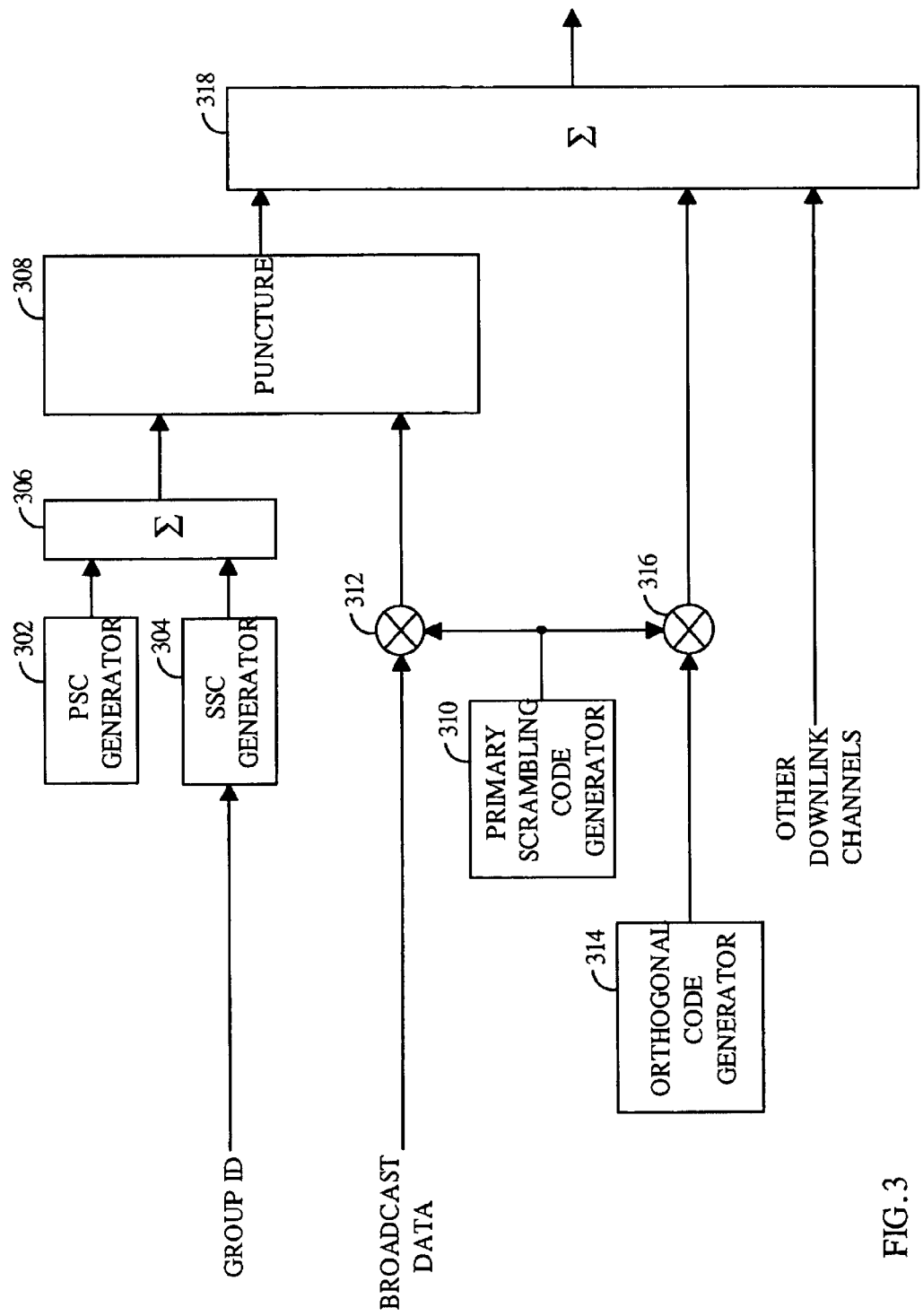
FIG. 3 is a functional block diagram illustrating the generation of the synchronization channel (SCH), the primary common control physical channel (P-CCPCH), and the common pilot channel (CPICH) by an exemplary node in an asynchronous CDMA communications system.

FIG. 3 is a functional block diagram illustrating the generation of the SCH, P-CCPCH, and the CPICH channel by the node. A PSC generator 302 can be used to generate the PSC sequence comprising a predetermined 256 chip sequence that is used in the user equipment for slot timing acquisition of the node. A SSC generator 304 can be used to generate the SSC sequence. The SSC sequence serves two functions. First, the SSC sequence is used in the user equipment to identify the frame timing of the node. Second, the SSC sequence also provides a code group identifier which identifies a group of eight possible primary scrambling codes. In W-CDMA communications systems using 512 possible primary scrambling codes, there are sixty-four code group identifiers. The SSC generator 304 first maps the group identifier into one of sixty-four possible fifteen element code words, and then maps each code word element which can have sixteen different possible values into one of sixteen possible 256 chip sequences. Each of the sixteen possible 256 chip sequences, as well as the PSC sequence, are orthogonal to one another. A summer 306 can be used to combine each of the fifteen 256 chip SSC sequences with the PSC sequence. A puncture element 308 can be used to puncture the PSC and SSC sequences from the summer 306 into the first part of the each slot. A primary scrambling code generator 310 can be used to generate the primary scrambling code for the node. The broadcast data can then be scrambled with the primary scrambling code using a multiplier 312 and punctured into parts 2–10 of each slot with the puncture element 308. An orthogonal code generator 314 can be used to generate the CPICH. The CPICH can then be scrambled with the primary scrambling code using a multiplier 316. The scrambled CPICH can be combined with the SCH and the scrambled P-CCPCH from the puncture element 308 as well as other downlink channels using a summer 318.

Figure 4:
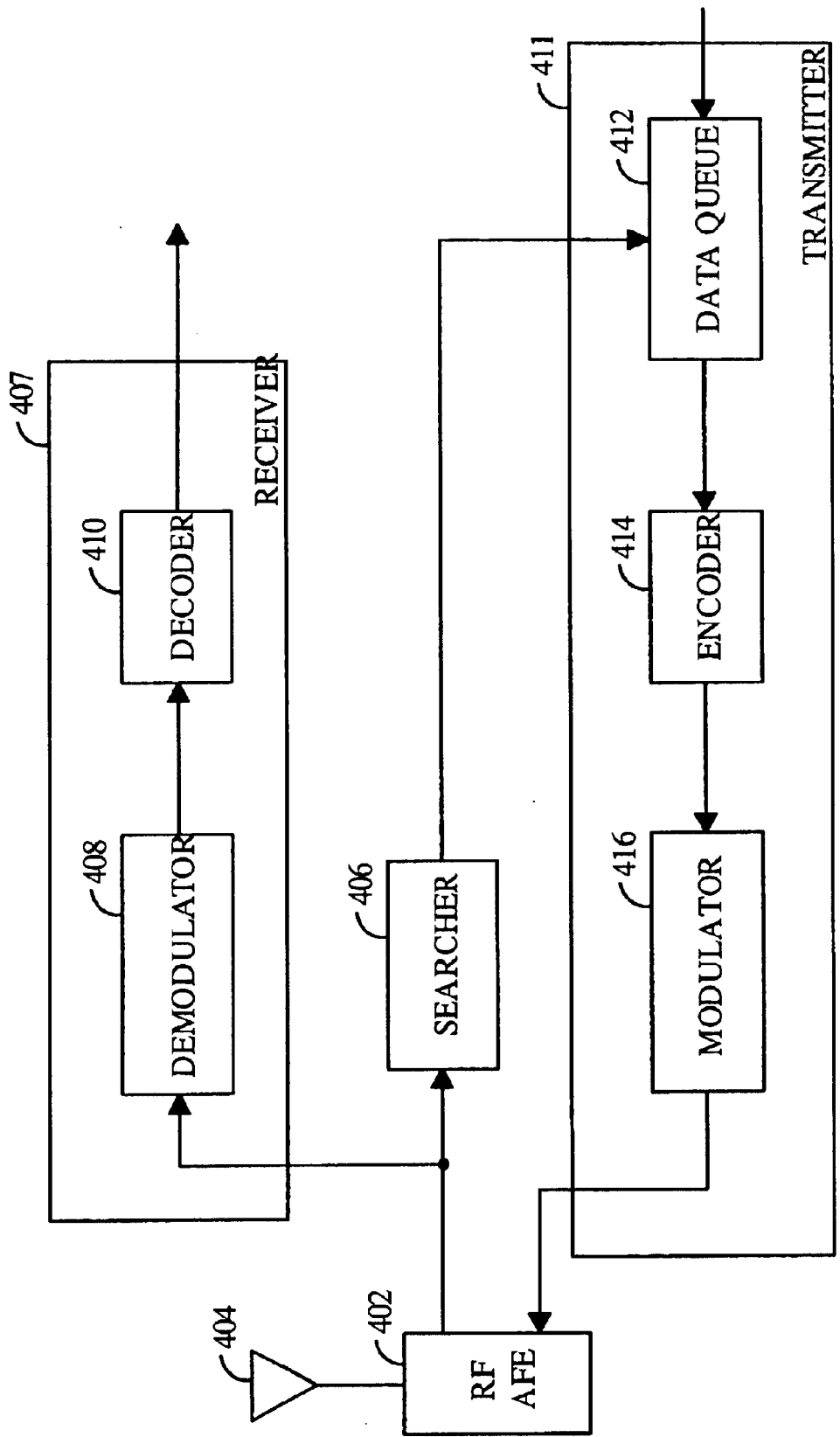
FIG. 4 is a conceptual overview of exemplary user equipment operating in an asynchronous CDMA communications.

FIG. 4 is a functional block diagram of exemplary user equipment operating in a W-CDMA communications environment. An RF analog front end (AFE) 402 coupled to one or more antennas 404 can be used to support a radio communication link a node. In the receive mode, a signal transmitted from a node is coupled from the antenna 404 to the AFE 402. The AFE filters and amplifies the signal, downconverts the signal to baseband, and digitizes the baseband signal.

The digital baseband signal can be provided to a searcher 406 for the purposes of acquisition and synchronization. The acquisition of the node's slot timing involves a search through the digital baseband signal to find the PSC sequence embedded in the SCH. This can be achieved by correlating the digital baseband signal with a locally generated PSC sequence. In a manner to be described in greater detail later, the frame timing can be extracted from the SSC sequences, and used to determine which code group out of the sixty-four possible code groups does the primary scrambling code of the node belong to. Knowing the code group of the primary scrambling code, the searcher 406 can determine which primary scrambling code is actually used by the node. This could be achieved by correlating the digital baseband signal with eight versions of the a priori known pilot signal that are generated by scrambling with the eight possible primary scrambling codes of the code group and selecting the one which results in the highest energy at the correlation output. With the information about the slot timing, the frame timing and the primary scrambling code, the user equipment is able to use the CPICH for channel estimation and coherent demodulation of data transmitted to the user equipment.

The digital baseband signal can also be provided to a receiver 407. The receiver includes a demodulator 408 and a decoder 410. The demodulator 408 can be implemented in a variety of fashions. By way of example, in W-CDMA communications systems, or any other type of communications system which uses diversity techniques to combat fading, a rake receiver may be used. The rake receiver typically utilizes independent fading of resolvable multipaths to achieve diversity gain. This can be achieved through a combined effort between the searcher 406 and the rake receiver. More specifically, the searcher 406 can be configured to identify strong multipath arrivals of the pilot signal. Fingers can then be assigned by the searcher 406 to identify the timing offsets of the multipaths. The fingers can be used by the rake receiver as a timing reference to correlate the traffic for each anticipated multipath reflection. The separate correlations can then be coherently combined and provided to the decoder 410 for deinterleaving, decoding, and frame check functions.

The user equipment may also include a transmitter 411 to support the transmit mode. The transmitter 411 includes a data queue 412, an encoder 414, and a modulator 416. The data queue 412 can be used to buffer data that the user equipment intends to send to the node. The frame timing information derived by the searcher 406 can be used to release traffic from the data queue 412 with a time offset from the corresponding downlink frame. In W-CDMA communications systems, data is released from the data queue 412 in a manner that creates a 1024 chip offset from the reception of a frame via the first detectable multipath of the downlink from the reference node relative to the transmission of the corresponding frame in the uplink. However, any offset may be used depending on the particular application and the overall design parameters.

The data from the data queue 412 can be provided to an encoder 414 for encoding, interleaving and frame check functions. The encoded data from the encoder 414 can then be provided to a modulator 416 which spreads the data with orthogonal codes. The modulated data can then be provided to the AFE 402 where it is filtered, upconverted, amplified and coupled to the antenna 404.

Figure 5:
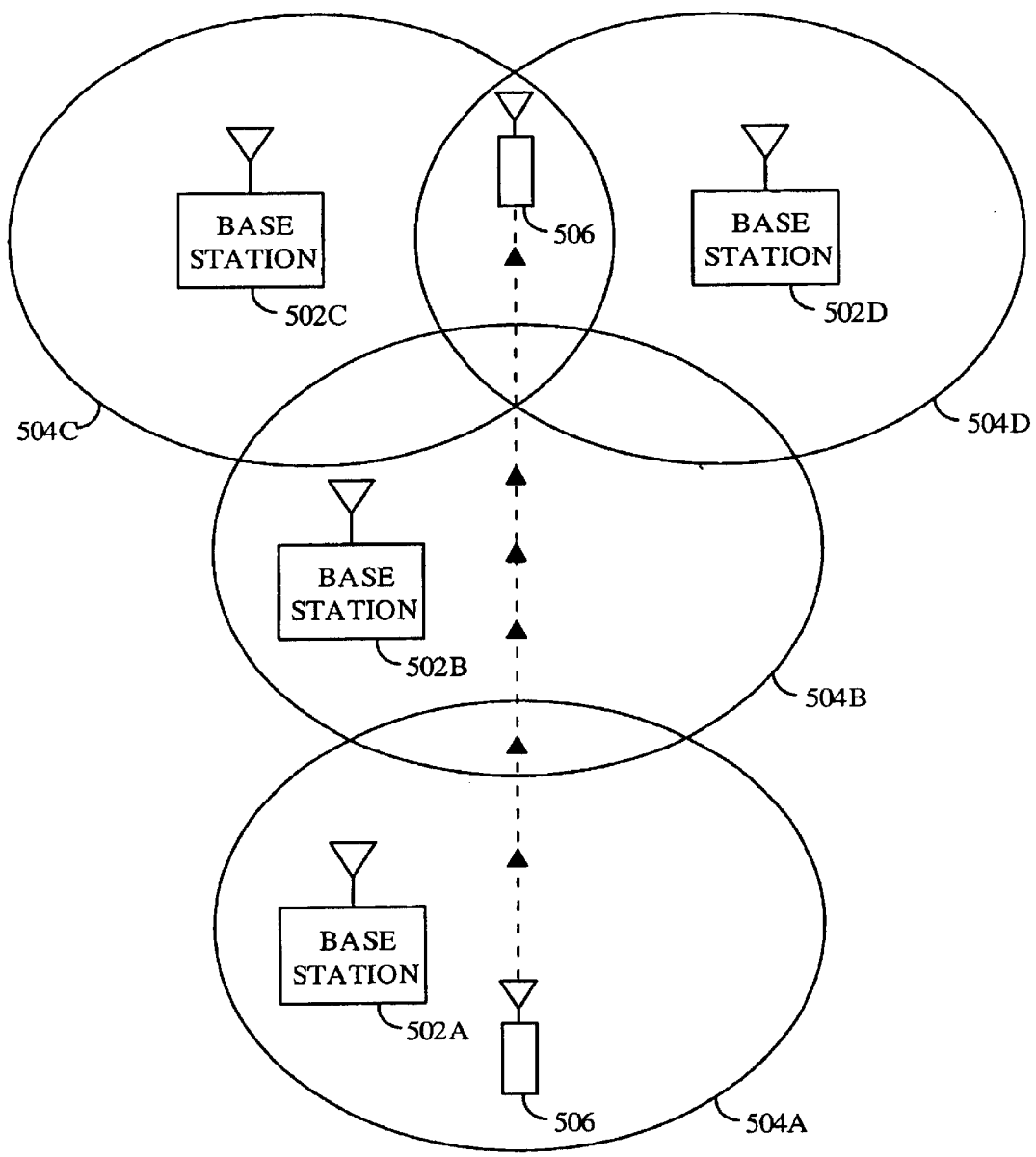
FIG. 5 is a functional block diagram of exemplary user equipment for use in an asynchronous CDMA communications system.

FIG. 5 is a diagram of a user equipment operating in a multiple node W-CDMA communications environment. In the W-CDMA communications environment, four nodes 502a–d are shown. Each node 502a–d transmits a pilot signal throughout its respective coverage region 504a–d. The pilot signal transmitted by each node 502a–d is spread with the same orthogonal code but scrambled with different primary scrambling codes. The primary scrambling code allows the pilot signals to be distinguished from one another thus distinguishing the originating nodes 502a–d. User equipment 506 is shown moving through different coverage regions by a series of broken lines. The user equipment 506 is shown initially moving through the first coverage region 504a. It is assumed that the user equipment 506 is attempting to establish communications with the network. From the first coverage region 504a, the user equipment 506 searches for the SCH and the CPICH for acquisition and synchronization as described earlier. After this is accomplished, the user equipment 506 determines the quality of the radio communication links to the nodes by measuring the strength of the pilot signals from the nodes. When the strength of the pilot signal exceeds a threshold, in this case the pilot signal from the first node 502a, the user equipment 506 attempts to access that node 502a. Depending on the resources available, the node 502a may establish a radio communication link to the user equipment 506 for downlink traffic transmissions. After the access attempt is completed successfully, the user equipment 506 adds that node 502a to its active set and establishes a radio communication link to transmit traffic to that node. At this point only the node 502a is a member of the active set of the user equipment 506. The user equipment 506 also uses that node 502a as a reference to synchronize its uplink frames.

As the user equipment 506 moves into an area where the first and second coverage regions 504a–b overlap, the strength of the pilot signal from the second node 502b increases until it exceeds the threshold. As a result, the second node 502b may be added to the active set of the user equipment 506 and another radio communication link established. In that case, the user equipment 506 communicates with both the first and second nodes 502a–b, but the transmission of the uplink frames by the user equipment 506 remains synchronized to the reference node 502a.

As the user equipment 506 moves out of the first coverage region 504a, the strength of the pilot signal from the first node 502a decreases until it drops below the threshold causing the reference node 502a to be removed from the active set of the user equipment 506. In at least one embodiment, the reference node is not removed from the active set immediately upon the pilot signal strength dropping below the threshold. Rather, the pilot signal strength should remain below the threshold for a predetermined time before the reference node is removed from the active set. This approach decreases the likelihood that the reference node is removed from the active set of the user equipment because of spurious signal level fluctuations. Once the reference node 502a is removed from the active set of the user equipment 506, the radio communication link between the two is torn down, and the user equipment 506 resynchronizes the timing of its uplink frames to the downlink frames from the second node 502b using the frame timing information extracted from the PSC and SSC sequences embedded in the SCH channel and the multipath timing estimated from the CPICH of the second node 502b. The second node 502b has now become the reference node.

As the user equipment 506 moves further towards its final destination, it moves into an area where the second, third and fourth coverage regions 504b–d overlap. In this area, the strength of the pilot signals from the third and fourth nodes 502c–d increase until each of them exceeds the threshold. As a result, the third and fourth nodes 502c–d may be added to the active set of the user equipment 506, and a radio communication link established between the user equipment 506 and each of the third and fourth nodes 502c–d. In that case, the user equipment 506 communicates with the second, third and fourth nodes 502b–d, but the transmission of the uplink frames remains synchronized to the second node 502b.

With the user equipment 506 synchronized to the second node 502b, an ambiguity may arise as to which of the two nodes 502c–d the user equipment 506 should select as the reference node as it moves out of the second coverage region 504b. This ambiguity can be resolved in any number of ways. By way of example, the user equipment 506 can resynchronize to the node that requires the least amount of slewing. More specifically, the user equipment 506 can resynchronize to the node for which the first multipath arrival of the start of a downlink frame is closest in time to the start of the first multipath arrival of the same downlink frame previously received from the second node 502b.

Figure 6:
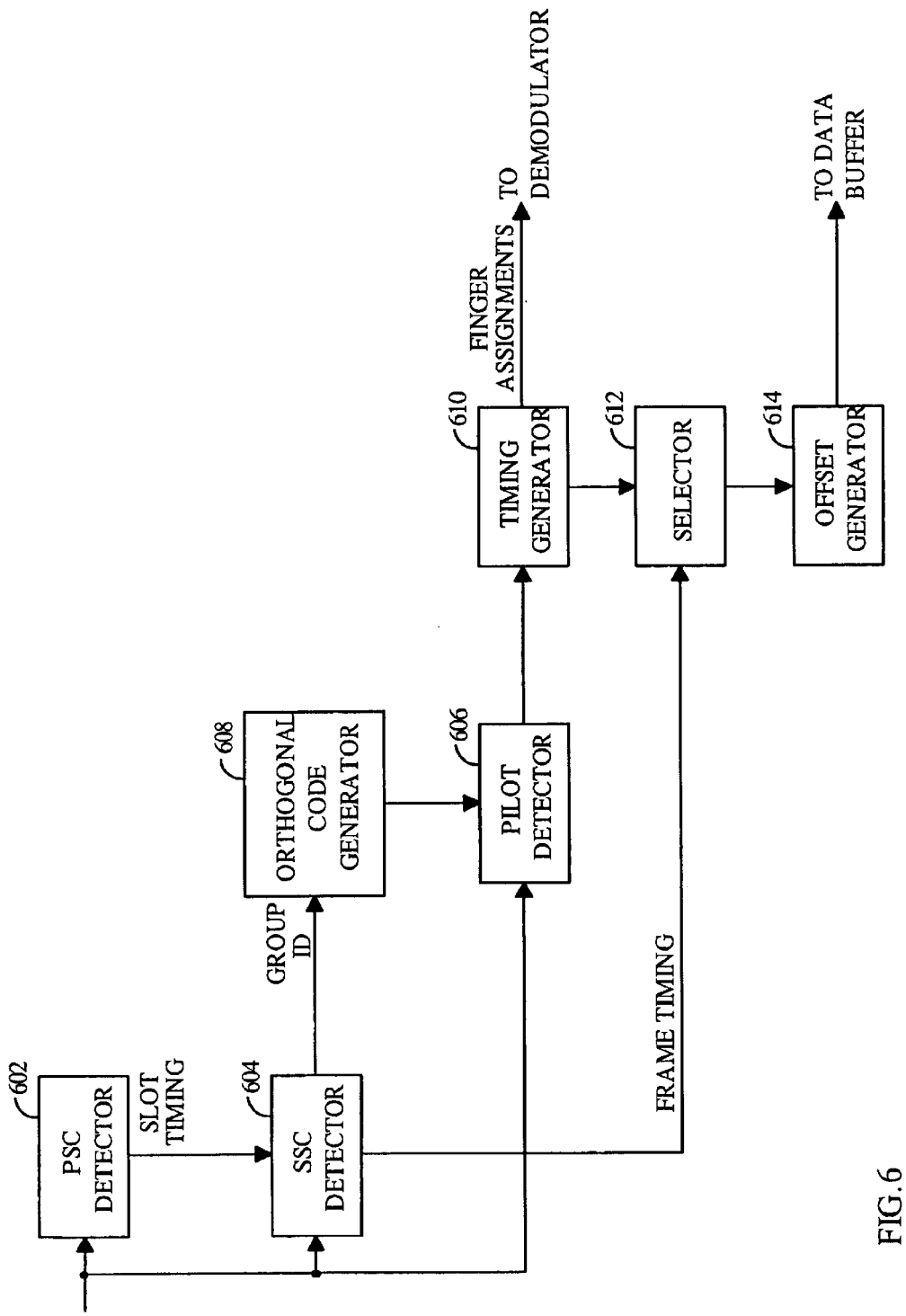
FIG. 6 is a functional block diagram of an exemplary searcher which can be utilized in the user equipment of FIG. 5.

FIG. 6 is a functional block diagram of an exemplary searcher which can be used in the user equipment of FIG. 4. The searcher includes a PSC detector 602. Since the PSC sequence is the same for each slot, the PSC detector 602 can estimate the slot timing by correlating the received digital baseband signal with a locally generated replica of the PSC sequence by means well known in the art.

An SSC detector 604 can be used to decode the SSC sequence by means well known in the art. More specifically, the SSC detector 604 correlates the SSC sequence in each slot (which can be one of sixteen possible sequences) over one or more frames to determine the sixteen code word elements. Based on the resultant code word, the SSC detector 604 can determine the first slot in the frame, and with the slot timing information from the PSC detector 602, can determine the frame timing. The SSC detector 604 can also de-map the code word into the code group identifier for the node's primary scrambling code.

A pilot detector 606 can be used to correlate the digital baseband signal with a locally generated scrambled orthogonal code. An orthogonal code generator 608 can be used to generate the eight possible scrambled orthogonal codes for the code group to which the node is assigned based on the code group identifier from the SSC detector 604. By means well known in the art, one or more slots of the received digital baseband signal can be correlated with each of the eight possible orthogonal codes until the pilot signal is detected.

As a result of this process, multiple copies of the pilot signal from the node may be detected at different times due to multipath reflections. A timing generator 610 can be used to detect the multipaths of the pilot signal and assign fingers to the rake receiver (not shown) accordingly. In communications involving multiple nodes, the frame timing for each node in the active set can be provided to a selector 612. The timing generator 610 can be used to select the frame timing for the first multipath arrival from the reference node. The selected frame timing is provided to an offset generator 614 to delay the uplink transmission from the reception of the corresponding downlink frame. In the described exemplary embodiment, the delay is 1024 chips, although any delay could be used depending on the particular application and the overall design constraints. The offset generator 614 can be used to delay the release of the data from the data queue 412 (see FIG. 4) accordingly. The offset generator 614 should be set for something less than the desired delay to account for the processing delay of the searcher 406, encoder 414, modulator 416, and AFE 402 (see FIG. 4).

During the traffic communications between the node and the user equipment, the pilot detector 606 continues to search for new pilot signals. Once a new pilot signal with sufficient strength is detected, the originating node can be added to the active set. At the same time, the pilot detector 606 continues to monitor the pilot signals from the active nodes using the specific primary scrambling codes established for each pilot signal during acquisition. Should the pilot signal from any node fall below a predetermined threshold for an extended period of time, then that node should be removed from the active set. In the event that the pilot signal from the reference node falls below the predetermined threshold, the pilot detector 606 can cause the timing generator 610 to select a new node as a timing reference from the active set. Assuming two or more nodes remain active, the timing generator 610 should select the node that requires the least amount of slewing. This means that the timing generator 610 should select the node in which the first multipath arrival for the downlink frame is closest in time to the first multipath arrival for the downlink frame previously transmitted from the former reference node. This selection criteria should be employed even if the frame timing information from the SCH for the former reference node is no longer available. This can be accomplished in a variety of ways. In user equipment having a rake receiver, the finger assignments for the former reference node can be used to select the appropriate node for resynchronization. Alternatively, the frame timing for the uplink transmission can be used to select the appropriate node for resynchronization. Specifically, with regard to the latter approach, the timing generator 610 can be used to establish a reference corresponding to the frame timing of the uplink transmission. The reference can be moved earlier in time by 1024 chips to derive the first multipath arrival for the downlink frame from the former reference node. This approach is an attractive solution because the frame timing for the uplink transmission can be determined even if the finger assignments for the former reference node are no longer present.

Regardless of the methodology, the timing generator 610 will select a new node as a reference to resynchronize its transmissions. The selector 612 can be used to select the frame timing for the first multipath arrival from the reference node. The selected frame timing can be provided to an offset generator 614 to delay the uplink transmission from the reception of the corresponding downlink frame from the new reference node. A trigger from the offset generator 614 can be used to release traffic from the data queue 412 in the transmitter 411 (see FIG. 4). The adjustment of the uplink transmission timing during resynchronization should be done smoothly rather than instantaneously. Otherwise the node receivers might not be able to track this change of transmit timing.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a cellular communications system selecting one of a plurality of asynchronous sources as a synchronization source, comprising:

establishing a reference corresponding to the timing of a first received signal from a first asynchronous source;

determining timing for each of a plurality of second received signals from a plurality of second asynchronous sources, wherein the timing of the first received signal from the first asynchronous source and the timings of the second received signals from the second asynchronous sources are asynchronous;

adjusting the reference to the timing of the one of the second received signals that is closest to the timing of the unadjusted reference to substantially minimize slewing; and synchronizing a signal to the reference for transmission.

2. The method of claim 1 wherein the reference is adjusted after the first signal from the first asynchronous source is no longer being received.

3. The method of claim 2 wherein the adjustment of the reference comprises using the timing of the synchronized signal to determine the reference after the first received signal from the first asynchronous source is no longer being received.

4. The method of claim 1 wherein the first received signal from the first asynchronous source comprises a frame, and the unadjusted reference corresponds to the start of the frame.

5. The method of claim 4 wherein the second received signals from the second asynchronous sources each comprises a frame, and the adjusted reference corresponds to the start of the frame for said one of the second asynchronous sources which is closest in time to the unadjusted reference.

6. The method of claim 5 wherein the synchronized signal is transmitted after the reference.

7. The method of claim 1 wherein the first received signal from the first asynchronous source comprises a plurality of multipath arrivals, and wherein the unadjusted reference corresponds to the first multipath arrival in time.

8. The method of claim 7 wherein the second received signals from the second asynchronous sources each comprise a plurality of multipath arrivals, and wherein the adjusted reference corresponds to the first multipath arrival of said one of the second asynchronous sources which is closest in time to the unadjusted reference.

9. A method in a cellular communications system for selecting one of a plurality of asynchronous sources as a synchronization source, comprising:

establishing a reference corresponding to a start of a frame of a first multipath arrival in rime from a first received signal that comprises a plurality of multipath arrivals from a first asynchronous source, determining timing for each of a plurality of second received frames from a plurality of second asynchronous sources, wherein each of the second received frames comprises a plurality of multipath arrivals, and wherein the timing of the frames of the first received signal from the first asynchronous source and the timings of the frames of the second received signals from the second asynchronous sources are asynchronous, adjusting the reference to correspond to the start of the frame of the first multipath arrival of said one of the second received signals that is closest to the timing of the unadjusted reference to substantially minimize slewing, and synchronizing a signal to the reference for transmission.

10. The method of claim 9 wherein the synchronized signal is transmitted after the reference.

11. The method of claim 9 wherein the first and second received signals from the first and second asynchronous sources, respectively, each comprise a pilot signal, the method further comprising:
- determining timing of the multipath arrival; from the first and second asynchronous sources using their respective pilot signals, and
- using the determined timing to demodulate the first and second received signals from the first and second asynchronous sources, respectively,
- wherein the adjustment of the reference comprises:
  - using the timing of the multipath arrivals to identify the first multipath arrival of said one of the second asynchronous sources which is closest in time to the unadjusted reference.

12. An apparatus in a cellular communications system for selecting one of a plurality of asynchronous sources as a synchronization source, comprising:
- a searcher configured to establish a reference corresponding to the timing of a first received signal from a first asynchronous source, determine timing for each of a plurality of second received signals from a plurality of second asynchronous sources, adjust the reference to the timing of the one of the second received signals that is closest to the timing of the unadjusted reference to substantially minimize slewing, and synchronize a signal to the reference for transmission,
- wherein the timing of the first received signal from the first asynchronous source and the timings of the second received signals from the second asynchronous sources are asynchronous.

13. The apparatus of claim 12 further comprising:
- a receiver configured to receive the first and second signals from the first and second asynchronous sources respectively.

14. The apparatus of claim 12 further comprising:
- a transmitter configured to transmit the synchronized signal.

15. The apparatus of claim 14 wherein the synchronized signal is transmitted after the reference.

16. The apparatus of claim 15 wherein the searcher further comprises:
- an offset generator configured to generate a trigger delayed in time from the reference, the trigger being used to transmit the synchronized signal.

17. The apparatus of claim 16 wherein the transmitter further comprises:
- a data buffer configured to store the synchronized signal, the data buffer being configured to release the synchronized signal for transmission in response to the trigger.

18. The apparatus of claim 12 wherein searcher is further configured to adjust the reference after the first signal from the first asynchronous source is no longer being received.

19. The apparatus of claim 18 wherein the searcher is further configured to determine the adjustment of the reference from the timing of the synchronized signal after the first received signal from the first asynchronous source is no longer being received.

20. The apparatus of claim 12 wherein the first received signal from the first asynchronous source comprises a frame, and wherein the searcher is further configured to establish the reference to correspond with the start of the frame.

21. The apparatus of claim 20 wherein the second received signals from the second asynchronous sources each comprises a frame, and wherein the searcher is further configured to adjust the reference to correspond with the start of the frame for said one of the second asynchronous sources which is closest in time to the unadjusted reference.

22. The apparatus of claim 12 wherein the first received signal from the first asynchronous source comprises a plurality of multipath arrivals, and wherein the searcher is further configured to establish the reference to correspond with the first multipath arrival in time.

23. The apparatus of claim 22 wherein the second received signals from the second asynchronous sources each comprise a plurality of multipath arrivals, and wherein the searcher is further configured to adjust the reference to correspond with the first multipath arrival of said one of the second asynchronous sources which is closest in time to the unadjusted reference.

24. An apparatus in a cellular communications system for selecting one of a plurality of asynchronous sources as a synchronization source comprising:
- a searcher configured to:
  - establish a reference corresponding to the start of a frame of a first multipath arrival in time from a first received signal that comprises a plurality of multipath arrivals from a first asynchronous source,
  - determine the timing for each of a plurality of second received frames from a plurality of second asynchronous sources, wherein each of the second received frames comprises a plurality of multipath arrivals, and wherein the timing of the frames of the first received signal from the first asynchronous source and the timings of the frames of second received signals from the second asynchronous sources are asynchronous,
  - adjust the reference to correspond to the start of the frame of the first multipath arrival of said one of the second received signals that is closest to the timing of the unadjusted reference to substantially minimize slewing, and
  - synchronize a signal to the reference for transmission.

25. The apparatus of claim 23 wherein the received signals from the first and second asynchronous sources each comprises a pilot signal, and wherein the searcher is further configured to determine the timing of the multipath arrivals from the first and second asynchronous sources using their respective pilot signals, the apparatus further comprising a demodulator configured to demodulate the received signals from the first and second asynchronous sources using the timing of the multipath arrivals determined by the searcher, and wherein the searcher is further configured to determine the adjustment of the reference signal by using the determined timing of the multipath arrival for said one of the second asynchronous sources which is closest in time to the unadjusted reference.

26. Computer-readable media embodying a program of instructions executable by a computer program to perform a method in a cellular communications system for selecting one of a plurality of asynchronous sources as a synchronization source, the method comprising:
- establishing a reference corresponding to the timing of a first received signal from a first asynchronous source;
- determining the timing or each of a plurality of second received signals from a plurality of second asynchronous sources, wherein the timing of the first received signal front the first asynchronous source and the timings of the second received signals from the second asynchronous sources are asynchronous;
- adjusting the reference to the timing mins of the one of the second received signals that is closest to the timing of the unadjusted reference to substantially minimize slewing; and
- synchronizing a signal to the reference for transmission.

27. The computer-readable media of claim 26 wherein the reference is adjusted after the first signal from the first asynchronous source is no longer being received.

28. The computer-readable media of claim 27 wherein the adjustment of the reference comprises using the timing of the synchronized signal to determine the reference after the first received signal from the first asynchronous source is no longer being received.

29. The computer-readable media of claim 26 wherein the first received signal from the first asynchronous source comprises a frame, and the unadjusted reference corresponds to the start of the frame.

30. The computer-readable media of claim 29 wherein the first and second received signals from the second asynchronous sources, respectively, each comprise a frame, and the adjusted reference corresponds to the start of the frame for said one of the second asynchronous sources which is closest in time to the unadjusted reference.

31. The computer-readable media of claim 26 wherein the first received signal from the first asynchronous source comprises a plurality of multipath arrivals, and wherein the unadjusted reference corresponds to the first multipath arrival in time.

32. The computer-readable media of claim 31 wherein the second received signals from the second asynchronous sources each comprises a plurality of multipath arrivals, and wherein the adjusted reference corresponds to the first multipath arrival of said one of the second asynchronous sources which is closest in time to the unadjusted reference.

33. Computer-readable media embodying a program of instructions executable by a computer program to perform a method in a cellular communications system for selecting one of a plurality of asynchronous sources as a synchronization source, the method comprising:

establishing a reference corresponding to the start of a frame of a first multipath arrival in time from a first received signal that comprises a plurality of multipath arrivals from a first asynchronous source, determining the timing for each of a plurality of second received frames from a plurality of second asynchronous sources, wherein each of be second received frames comprises a plurality of multipath arrivals, and wherein the timing of the frames of the first received signal from the first asynchronous source and the timings of the frames of the second received signals from the second asynchronous sources are asynchronous, adjusting the reference to correspond to a start of the frame of the first multipath arrival of said one of the second received signals that is closest to the timing of the unadjusted reference to substantially minimize slewing, and synchronizing a signal to the reference for transmission.

34. The computer-readable media of claim 32 wherein the first and second received signals from the first and second asynchronous sources, respectively, each comprise a pilot signal, the method further comprising:

determining the timing of the multipath arrivals from the first and second asynchronous sources using their respective pilot signals;

and using the determined timing to demodulate the first and second received signals from the first and second asynchronous sources, respectively, wherein the adjustment of the reference comprises:
using the timing of the multipath arrivals to identify the first multipath arrival of said one of the second asynchronous sources which is closest in time to the unadjusted reference.

35. An apparatus in a cellular communications system for selecting one of a plurality of asynchronous sources as a synchronization source, comprising:

reference means for establishing a reference corresponding to the timing of a first received signal from a first asynchronous source;

means for determining the timing for each of a plurality of second received signals from a plurality of second asynchronous sources, wherein the timing of the first received signal from the first asynchronous source and the timings of the second received signals from the second asynchronous sources are asynchronous;

adjustment means for adjusting the reference to the timing of the one of the second received signals that is closest to the timing of the unadjusted reference to substantially minimize slewing; and means for synchronizing a signal to the reference for transmission.

36. The apparatus of claim 35 further comprising:
means for receiving signals from the first and second asynchronous sources.

37. The apparatus of claim 35 further comprising:
transmission means for transmitting the synchronized signal.

38. The apparatus of claim 35 further comprising:
transmission means for transmitting the synchronized signal after the reference.

39. The apparatus of claim 38 further comprising:
means for generating a trigger offset in time from the reference, the trigger being used by the transmission means to transmit the synchronized signal.

40. The apparatus of claim 39 wherein the transmission means further comprises:
buffer means to store the synchronized signal, the buffer means being configured to release the synchronized signal for transmission in response to the trigger.

41. The apparatus of claim 35 wherein the adjustment means adjusts the reference after the first signal from the first asynchronous source is no longer being received.

42. The apparatus of claim 41 adjustment means further comprises:
means for determining the adjustment of the reference from the timing of the synchronized signal after the first received signal from the first asynchronous source is no longer being received.

43. The apparatus of claim 35 wherein the first received signal from the first asynchronous source comprises a frame, and wherein the reference means establishes the reference to correspond with the start of the frame.

44. The apparatus of claim 43 wherein the second received signals from the second asynchronous sources each comprise a frame, and wherein the adjustment means adjusts the reference to correspond with the start of the frame for said one of the second asynchronous sources which is closest in time to the unadjusted reference.

45. The apparatus of claim 35 wherein the first received signal from the first asynchronous source comprises a plurality of multipath arrivals, and wherein the reference means establishes the reference to correspond with the first multipath arrival in time.

46. The apparatus of claim 45 wherein the received second signals from the second asynchronous sources each comprises a plurality of multipath arrivals, and wherein the adjustment means adjusts the reference to correspond with the first multipath arrival of said one of the second asynchronous sources which is closest in time to the unadjusted reference.

47. An apparatus in a cellular communications system for selecting one of a plurality of asynchronous sources as a synchronization source, comprising:

means for establishing a reference corresponding to the start of a frame of a first multipath arrival in time from a first received signal that comprises a plurality of multipath arrivals from a first asynchronous source, means for determining the timing for each of a plurality of second received frames from a plurality of second asynchronous sources, wherein each of the second received frames comprises a plurality of multipath arrivals, and wherein the timing of the frames of the first received signal from the first asynchronous source and the timings of the frames of the second received signals from the second asynchronous sources are asynchronous, means for adjusting the reference to correspond to the start of the frame of the first multipath arrival of said one of the second received signals that is closest to the timing of the unadjusted reference to substantially minimize slewing, and means for synchronizing a signal to the reference for transmission.

48. The apparatus of claim 46 wherein the first and second received signals from the first and second asynchronous sources, respectively, each comprise a pilot signal, the apparatus further comprising means for determining the timing of the multipath arrivals from the first and second asynchronous sources using their respective pilot signals, means for demodulating the first and second received signals from the first and second asynchronous sources using the timing of the multipath arrivals, and wherein the adjustment means adjusts the reference signal by using the determined timing of the multipath arrival for said one of the second asynchronous sources which is closest in time to the timing of the unadjusted reference.

49. An asynchronous cellular communications system, comprising:

a first asynchronous source that transmits a first pilot signal frame over a first coverage region;

a destination station that initially adds the first asynchronous source to an active set and transmits uplink frames synchronized to the first pilot signal frame when in the first coverage region;

a second asynchronous source that transmits a second pilot signal frame over a second coverage region; and a third asynchronous source that transmits a third pilot signal frame over a third coverage region that overlaps with at least the second coverage region, wherein the pilot signal frames transmitted from the first, second and third sources are asynchronous, and wherein, when the first asynchronous source is removed from the active set, the destination station selects one of the first asynchronous source and the third asynchronous source and resynchronizes the timing of the uplink frames to the timing of downlink frames from the one of the second pilot signal frame and the third pilot signal frame that is closest to the timing a of the first pilot signal frame such that the amount of adjustment required by the destination station to resynchronize to the synchronization source is minimized.

50. A system according to claim 49, wherein the destination station resynchronizes the timing of the uplink frames to the dining of downlink frames from the one of the second pilot signal frame and the third pilot signal frame that is closest to the timing of the first pilot signal frame such that the amount of adjustment required to resynchronize to the synchronization source is minimized, comprises:

wherein the destination station resynchronizes to the timing of downlink frames from the one of the second pilot signal frame and the third pilot signal frame in which a first multipath arrival of the start of a downlink frame that is closest to the timing of the start of a first multipath arrival of the same downlink frame that was previously received from the first asynchronous source.

51. A system according to claim 19, wherein the destination station further comprises a searcher, the searcher comprising:

a primary synchronization code detector that detects a primary synchronization code sequence by estimating slot timing by correlating a received digital baseband signal with a locally generated replica of the primary synchronization code sequence, wherein the primary synchronization code sequence is the same for each slot; and a secondary synchronization code detector that detects a secondary synchronization code sequence by correlating an secondary synchronization code sequence in each slot over one or more frames, determining the first slot in the frame, and using the estimated slot timing information from the primary synchronization code detector to determine the frame timing, wherein the one of the second pilot signal frame and the third pilot signal frame that is closest to the timing of the first pilot signal frame is determined based on the primary synchronization code sequence and the secondary code synchronization sequence, and multipath timing estimated from the one of the second pilot signal and the third pilot signal.

52. A system according to claim 51, wherein the searcher further comprises:

an orthogonal code generator that receives the output of the secondary synchronization code detector;

a pilot detector that receives a baseband signal and the output of the orthogonal code generator;

a timing generator that selects the source in which the first multipath arrival for the downlink frame is closest in time to the timing of the first multipath arrival for the downlink frame previously transmitted from the first asynchronous source, and establishes a reference corresponding to the uplink frame timing that is used to select the appropriate source for resynchronization, wherein the reference can be moved earlier in time to derive the first multipath arrival for the downlink frame from the first asynchronous source; and a selector that selects the frame timing for the first multipath arrival from the first asynchronous source; and an offset generator that receives the selected frame timing from the selector for the first multipath arrival from the first asynchronous source, and delays the uplink transmission from the reception of the corresponding downlink frame from the selected one of the second pilot signal frame and the third pilot signal frame in which a first multipath arrival of the start of a downlink frame has a timing closest to the timing of the start of a first multipath arrival of the same downlink frame that was previously received from the first asynchronous source.

53. A system according to claim 52, wherein the destination station further comprises a rake receiver having a plurality of fingers wherein finger assignments for the first asynchronous source are used to select the appropriate source for resynchronization.

* * * * *